(12) United States Patent
Whitney

(10) Patent No.: US 9,032,665 B2
(45) Date of Patent: May 19, 2015

(54) AQUAPONIC VERTICAL GARDEN WITH INTEGRATED AIR CHANNEL FOR PLANT-BASED AIR FILTRATION

(71) Applicant: INKA BIOSPERIC SYSTEMS, Half Moon Bay, CA (US)

(72) Inventor: Christopher J. Whitney, San Francisco, CA (US)

(73) Assignee: INKA Biospheric Systems, Half Moon Bay, CA (US)

( * ) Notice: Subject to any disclaimer, the term of this patent is extended or adjusted under 35 U.S.C. 154(b) by 0 days.

(21) Appl. No.: 13/773,201

(22) Filed: Feb. 21, 2013

(65) Prior Publication Data

US 2013/0160363 A1     Jun. 27, 2013

Related U.S. Application Data

(63) Continuation-in-part of application No. 12/792,696, filed on Jun. 2, 2010, now Pat. No. 8,578,651, which is a continuation-in-part of application No. 12/403,939, filed on Mar. 13, 2009, now Pat. No. 8,181,391.

(60) Provisional application No. 61/069,447, filed on Mar. 14, 2008.

(51) Int. Cl.
*A01G 31/00*     (2006.01)
*A01G 31/02*     (2006.01)
*A01G 9/02*      (2006.01)

(52) U.S. Cl.
CPC ............... *A01G 31/02* (2013.01); *A01G 9/022* (2013.01)

(58) Field of Classification Search
CPC ........... A01G 31/02; A01G 9/02; A01G 9/16; A01G 9/022; A01G 31/06; A01G 31/001; A01G 9/00; A01G 31/00
USPC ........... 47/59 R, 64, 59 S, 60, 61, 62 R, 62 A, 47/62 C, 62 E, 62 N, 63, 17, 65.5, 66.1, 47/66.6, 82, 83, 39
See application file for complete search history.

(56) References Cited

U.S. PATENT DOCUMENTS

| | | | | |
|---|---|---|---|---|
| 4,196,544 A | * | 4/1980 | Davis et al. | 47/17 |
| 4,295,296 A | * | 10/1981 | Kinghorn | 47/82 |
| 5,315,834 A | * | 5/1994 | Garunts et al. | 62/78 |
| 5,363,594 A | * | 11/1994 | Davis | 47/82 |
| 5,555,676 A | * | 9/1996 | Lund | 47/82 |
| 6,006,471 A | * | 12/1999 | Sun | 47/69 |
| 6,230,437 B1 | * | 5/2001 | Wolverton et al. | 47/39 |
| 6,499,249 B1 | * | 12/2002 | Luijkx | 47/41.01 |
| 6,634,138 B2 | * | 10/2003 | Katzman | 47/79 |
| 6,727,091 B2 | * | 4/2004 | Darlington | 435/299.1 |

(Continued)

*Primary Examiner* — Trinh Nguyen
(74) *Attorney, Agent, or Firm* — Staniford Tomita LLP

(57) ABSTRACT

Embodiments are described for a closed-loop, vertical garden system for growing plants and filtering air and water comprising: a support structure; a composite, grow media configured to physically support the growth of plants and distribute water to the roots of the plants through capillary action through the area of the grow media; a water source coupled to the grow media through a pump and plumbing system, wherein the plumbing system is configured to draw water from the water source through the grow media and back to the water source in substantially closed loop aquatic system; and an air flow subsystem configured to draw outside air through the plants and transmit filtered air back out of the support structure.

7 Claims, 14 Drawing Sheets

(56) References Cited

U.S. PATENT DOCUMENTS

| | | | |
|---|---|---|---|
| 7,243,460 B2* | 7/2007 | Darlington | 47/62 R |
| 2002/0073613 A1* | 6/2002 | Wijbenga | 47/17 |
| 2006/0150500 A1* | 7/2006 | Behrens | 47/65.9 |
| 2007/0144067 A1* | 6/2007 | Farhadi | 47/39 |
| 2009/0007486 A1* | 1/2009 | Corradi | 47/62 R |
| 2011/0154985 A1* | 6/2011 | Mittelmark | 95/1 |
| 2011/0215937 A1* | 9/2011 | Carroll et al. | 340/604 |
| 2013/0227884 A1* | 9/2013 | Park et al. | 47/66.6 |

\* cited by examiner

US 9,032,665 B2

AQUAPONIC VERTICAL GARDEN WITH INTEGRATED AIR CHANNEL FOR PLANT-BASED AIR FILTRATION

CROSS-REFERENCE TO RELATED APPLICATIONS

The present application is a Continuation-In-Part of U.S. patent application Ser. No. 12/792,696, entitled "Aquaponic Vertical Garden Using a Stretchable Grow Media" filed on Jun. 2, 2010, which in turn is a Continuation-in-Part of U.S. patent application Ser. No. 12/403,939, filed on Mar. 13, 2009 and entitled "Vertical Aquaponic Micro Farm" now issued as U.S. Pat. No. 8,181,391, which in turn claims the benefit of U.S. Provisional Patent Application No. 61/069,447 entitled "Vertical Aquaponic Micro Farm" and filed on Mar. 14, 2008, all of which are hereby incorporated by reference in their entirety. The present invention is related to U.S. patent application Ser. No. 12/792,683, filed on Jun. 2, 2010 and entitled "Grow and Support Media for Vertical Garden Applications."

FIELD

Embodiments of the invention relate generally to plant growing systems, and more specifically, to vertical gardens incorporating grow media and air filtration structures.

BACKGROUND

Limited space is often a significant constraint in garden and plant growing applications, especially in urban locations and building (interior and exterior) environments. Vertical gardens have been developed as a way of facilitating the growth of ornamental and food plants along building walls, balconies, rooftops and other similar locations. Such vertical gardens can be an effective way to grow a large number of plants in limited space and transform stark building environments into areas of greenery and lush landscapes. Present vertical garden systems, however, suffer from certain disadvantages that limit them from being truly applicable to a wide range of applications.

A vertical garden is basically a framework of plants placed onto the side of a building or a wall. They can be placed indoors or outdoors and in full or partial sun environments, depending on what types of plants are grown. Present vertical gardens are available only in a few limited configurations. The most basic vertical garden consists of a series of bags or containers that hold soil, and that are attached or hung directly on a wall or suspended vertically in a frame or similar structure. Such gardens are basically soil gardens that have been oriented vertically, with plants growing vertically upward from bags or baskets of soil. Soil based vertical gardens may provide some degree of space savings, but they still rely on soil as the growth media. Consequently, they suffer from the disadvantages traditionally associated with soil, that is, they are heavy, bulky, dirty, and inefficient with regard to water use.

Another vertical garden system uses a metal frame with a waterproof backing material (e.g., Polyvinyl Chloride PVC) that is attached directly to a wall or vertical surface. A second material, such as felt or cotton is glued or otherwise attached to the PVC layer and provides a capillary structure for supporting the plants and distributing water. A variation of this type of wall garden is a system that uses particle board with an absorbent filler material that holds water in a certain width (e.g., two to three inches) of material, and which is attached to the hard vertical surface. One disadvantage of these systems is that since they attach directly to the wall surface, a waterproof layer must be provided to eliminate the possibility of wall damage. Another disadvantage of these systems is that because the grow media is directly attached to a hard substrate or waterproof layer, they are limited with respect to configuration and applications on different types of surfaces, or different size surfaces.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

Embodiments are illustrated by way of example and not limitation in the figures of the accompanying drawings, in which like references indicate similar elements.

SUMMARY OF EMBODIMENTS

Figure 1:
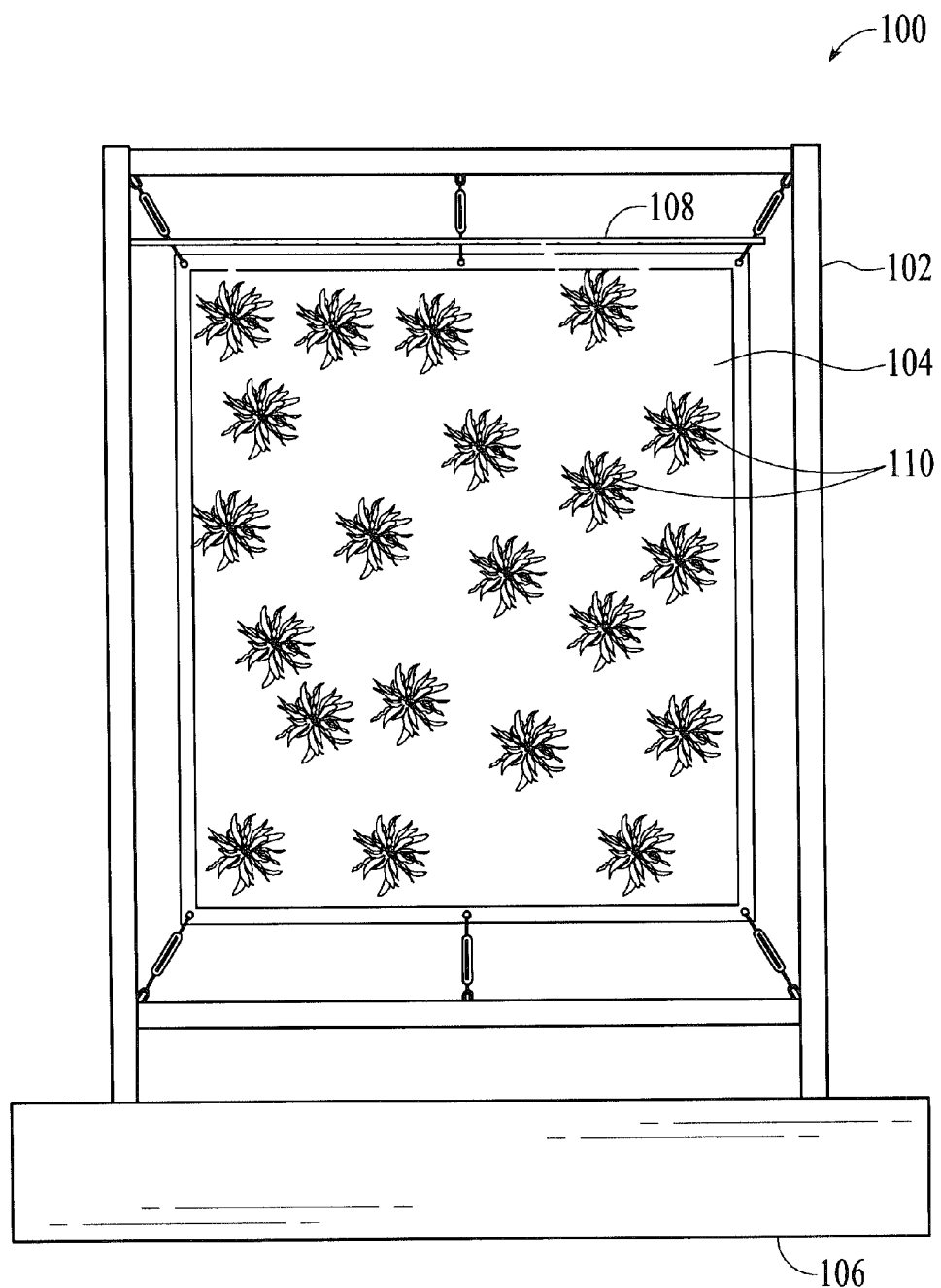
FIG. 1 is a front view of a vertical garden using a biomatrix grow media, according to an embodiment.

In an embodiment, a vertical garden or micro farm is designed to support and incorporate a variety of decorative and/or food plants. The system incorporates a biologically active grow mat and filter system and combines a biological filter system with aquaculture, hydroponics, solar, wind, and battery technologies. The vertical aquaponic garden represents a self-sustaining micro farm that can be set up in any area with exposure to sunlight and/or wind. It can be used in exterior locations, or interior applications with the addition of appropriate lighting systems. Depending on application, the system uses significantly less water that required for traditional farming. Water is recycled through the grow media bed (biomatrix) and a biologic filter, which can be inoculated with a culture of nitrifying bacteria in combination with the plant roots. The biomatrix for the grow media comprises a permeable or non-permeable backing layer that has a defined elasticity to facilitate stretching, an activated carbon filter layer attached to the backing layer, one or more capillary biomats attached to the filter layer that physically support the growth of one or more varieties of plants and distribute water to the roots of the plants through capillary action through the area of the grow media, and an optional front panel layer attached to one of the capillary biomat layers, the front panel layer comprising a porous structure made of polypropylene configured to support the plants growing in a direction substantially perpendicular to the plane the front panel surface. The backing layer may be a ultraviolet blocking backing layer of an opaque dark color configured to prevent ultraviolet radiation from penetrating a back surface of the backing layer, and to prevent water from penetrating a front surface of the backing layer. The grow media is provided as a thin lightweight fabric-like media, that can be used in a frame-based vertical garden or attached directly to a vertical surface.

Embodiments are also directed to a wall filter system that utilizes the natural capacity of plants to filter air. The grow media is mounted onto a perforated backing so that air is drawn across the entire planted structure, including leaves and roots. This system maximizes the absorption of carbon dioxide and airborne volatile organic compounds (VOCs). In an interior application, such a system can help improve overall indoor air quality, reduce levels of VOCs and carbon dioxide, and provide water-efficient interior landscaping.

DETAILED DESCRIPTION

Embodiments of grow media and structure for vertical gardens and microfarms are described. In the following description, numerous specific details are introduced to provide a thorough understanding of, and enabling description for, embodiments of the system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

FIG. 1 is a front view of a vertical garden using a biomatrix grow media, according to an embodiment. In one embodiment, the vertical garden comprises a substantially rectangular frame structure that supports a multi-layer grow media on which various types of plants are grown. FIG. 1 illustrates a vertical garden structure 100 under cultivation with actively growing plants 110 growing out of a hydroponic garden bio media 104. The grow media 104 is a multilayer fabric assembly that is also referred to as a "biomatrix" or "biomat". The vertical garden frame structure 102 of FIG. 1 is attached to a water reservoir or trough 106 which contains a pump. The pump circulates water back up for distribution through a sprinkler or other water distribution channel 108. The pump may be actuated by a timer that pumps water at certain time intervals or at a certain flow rate depending on environmental conditions and the needs of the plants. As shown, the structure 102 comprises a set of metal tubes that are arranged in a square or rectangular shape. The frame structure 102 may be made of any number of materials, such as steel, aluminum, plastic, wood, bamboo, and carbon fiber, or any other suitable material depending upon cost, location, and environmental factors. The frame structure can be fashioned in many different dimensions and shapes, depending on needs and size constraints. Appropriate power supply leads or generators can be attached to power to the pond pump, timer, and any other electrical components of garden 100.

The vertical garden 100 incorporates a biologically active grow mat and filter system and combines a biological filter system with aquaculture and hydroponics technologies. Centrally positioned in the frame structure 100 is a substantially vertical hydroponic plant growing system. In one embodiment, plants 110 are planted into a series of vertically set, vegetable fiber or food grade fiber bio-mats, which may additionally include activated carbon filtration mats. Alternatively the fiber biomat substrate may be replaced with stones, glass or brick fragments, or any combination thereof.

As shown in FIG. 1, the biomat 104 (also referred to as a "biomatrix") is a flexible substrate material that is attached to connection points of the frame through cables and connectors. The embodiment of FIG. 1 illustrates a biomat 104 that is attached to the corners of the frame 102 through appropriate cable/connector assemblies. Alternatively, the biomat 104 can be attached to other portions of the frame, such as along the sides of the tubes. In an embodiment, the main backing portion of the biomat is a vinyl layer that can be stretched taut within the frame to orient the grow layers of the biomat in a substantially vertical position within the frame.

In a general implementation, water is recycled through the biomat grow media 104 and a biologic filter, which can be inoculated with a culture of nitrifying bacteria in combination with the plant roots. Water is held within the trough 106 for recycling through the biomat on a periodic basis. In an embodiment fish may be kept in the trough to implement a closed-loop biological hydroponic aquaculture system, as described in related patent application Ser. No. 12/403,939.

The entire structure 100 of FIG. 1 may be set on a steel foundation for added stability. Alternatively, the frame posts may be set in concrete or equivalent foundations for permanent or semi-permanent deployment. In a further alternative embodiment, the frame structure may be placed on casters, wheels or movable pallets for mobile or temporary deployments. An optional light assembly (bulbs or bar) may be attached to the frame to provide light to the plants for use in low-light environments.

Figure 2:
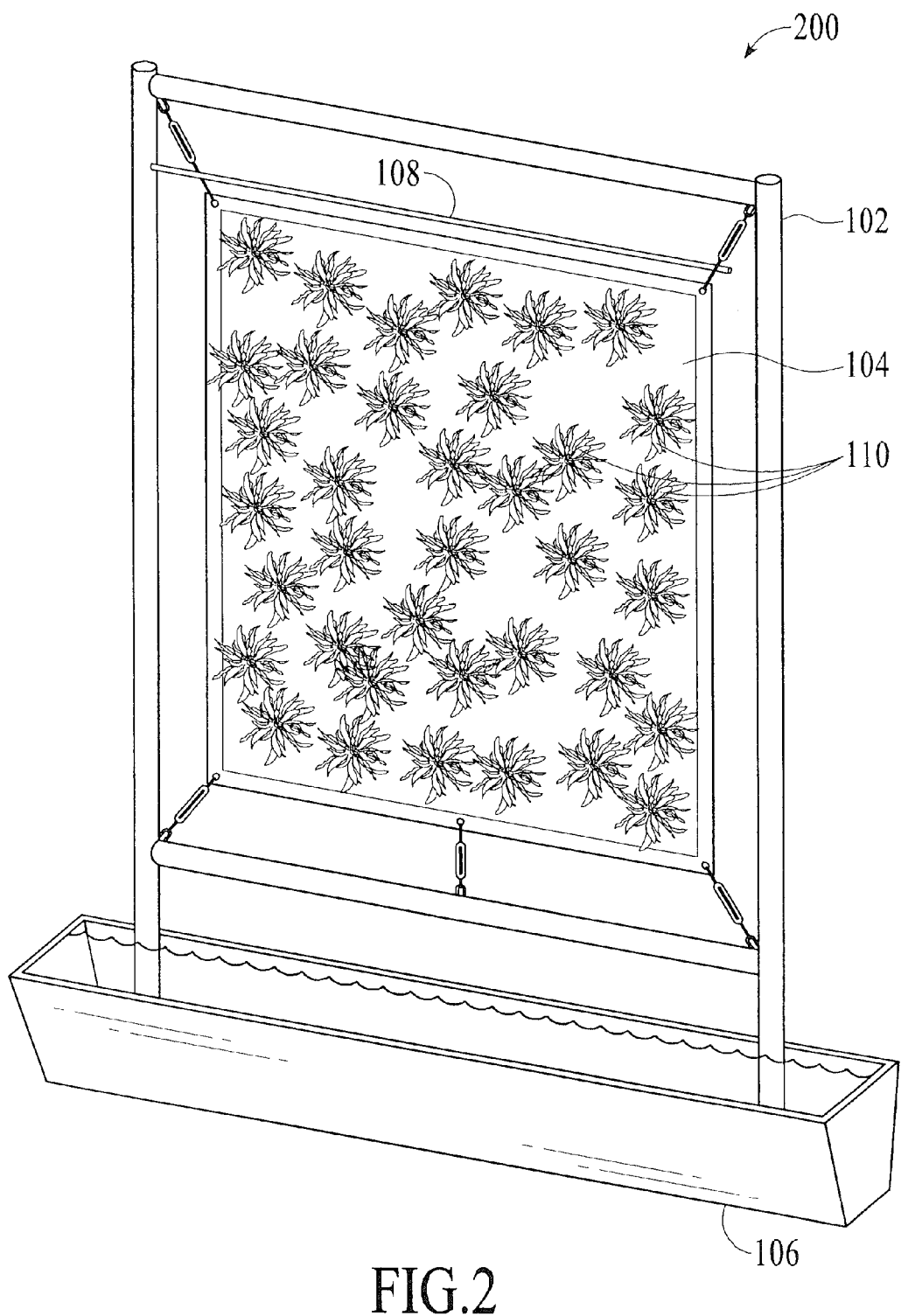
FIG. 2 is a perspective view of the vertical garden of FIG. 1, according to an embodiment.

FIG. 2 is a perspective view of the vertical garden of FIG. 1, according to an embodiment. As shown in FIG. 2, the vertical garden constitutes an appealing structure once it is populated with growing plants. It can be fashioned into virtually any shape and size, and is made of relatively lightweight material to facilitate portability and placement in a wide range of locations. The embodiments of FIGS. 1 and 2 illustrate the biomat hanging from a frame or mounted on a scaffold structure. Such a structure can be used as a standalone vertical garden, or it may be positioned adjacent to, or even integrated as part of a building wall.

Figure 3:
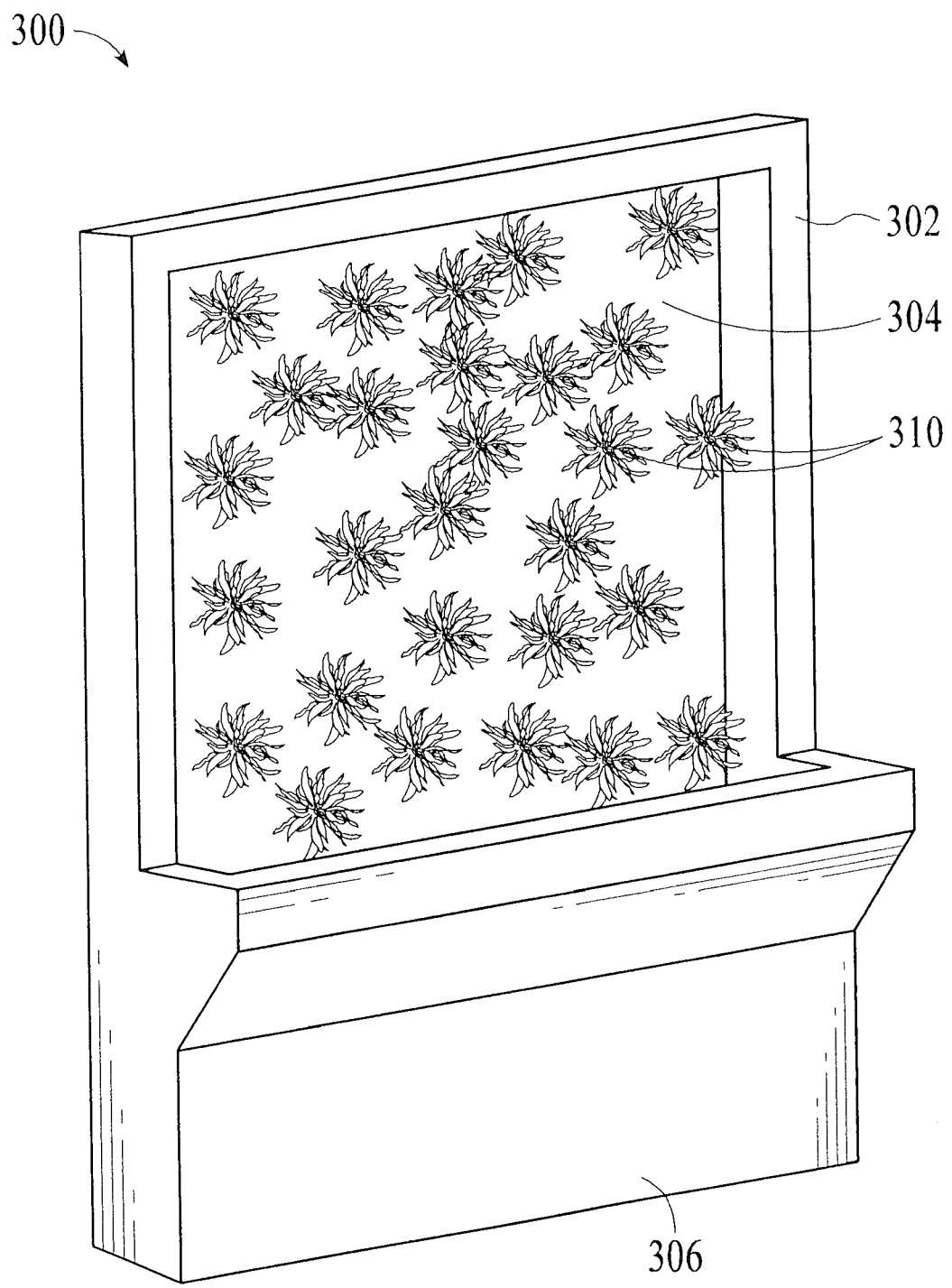
FIG. 3 is a perspective view of a vertical garden using a biomatrix grow media, according to an alternative embodiment.

The vertical garden may be formed into various different shapes and sizes according to particular constraints and needs. It may be embodied in the frame structure of FIG. 1, which may be of a size on the order of 10×12 feet, or similar dimensions, that may be suitable for outdoor or greenhouse environments. Alternatively, it may be embodied in a smaller, more portable structure for inside or small garden environments. As such, the garden structure may be on the order of 3×5 feet, or similar dimensions. In such an embodiment, the garden structure may be formed into an integrated decorative structure that resembles stone or plaster, and that may suitable for indoor or even table-top use. FIG. 3 is a perspective view of a vertical garden using a biomatrix grow media, according to an alternative embodiment. As shown in FIG. 3, the vertical garden 300 comprises a frame structure 302 that integrally includes a water basin 306. The biomatrix 304 is attached to a surface of the frame and supports the growth of plants 310. The garden structure 302 may be made of any appropriate material, such as plaster, cement, stone, plastic, wood, and the like. It may be molded or carved into any shape and size that is suitable for supporting a biomatrix of the desired dimension. In an embodiment, the biomatrix 304 may be attached to a vertical surface of the structure 302. Alternatively, the structure 302 may be formed to include at least a partially open frame, and the biomatrix can be suspended within the frame in a vertical or substantially vertical orientation. The basin 306 holds water and also includes a pump that feeds water back through the biomatrix for periodic and constant irrigation of the biomatrix.

For embodiments in which the backing material comprises a permeable material, the vertical garden may be embodied within a space frame that allows growing of plants from both surfaces or sides of the biomatrix material. Such a space frame can be used to construct garden cubicles for use in offices or interior applications, or similar open environments.

Figure 4:
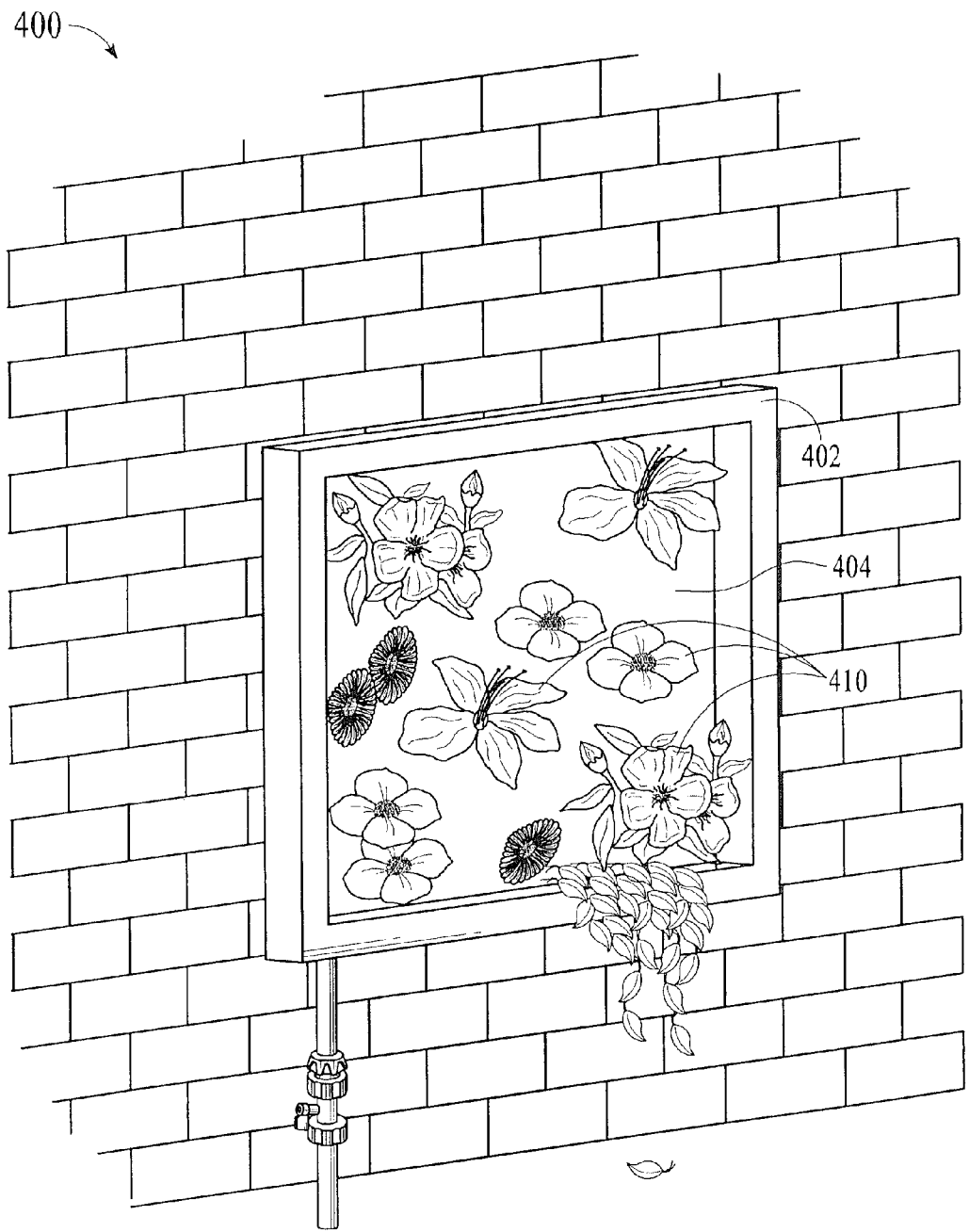
FIG. 4 is a perspective view of a vertical garden attached to the side of a building wall, according to an embodiment.

In one embodiment, the vertical garden may be configured to be mounted on the side of a building wall or other large-scale vertical structure. FIG. 4 is a perspective view of a vertical garden attached to the side of a building wall, according to an embodiment. In this case, the biomatrix grow media 404 is attached directly to a wall surface 402. This allows plants 410 to appear as if they are growing out of the surface of the wall. The biomatrix may be irrigated by external means, such as a hose is used manually or automatically to spray water onto the plants 410 and the biomatrix 404. Alternatively, a separate water trough and pump system (not shown) may be used to provide water to the biomatrix. The biomatrix can be attached to the wall surface by glue, nails, or other appropriate attachment means, depending upon the material of the wall, and the size and shape of the biomatrix.

In an alternative embodiment, the vertical wall garden may be implemented along the surface of a chain link fence, or any other trellis or fence structure. In this case, the fence forms the frame structure, and the biomatrix is attached through tension cables to appropriate spots of the fence. For example, a rectangular sheet of biomatrix may be provided with cables and hooks attached to its four corners. These can then be used to hook the biomatrix along the side of a chain link fence. Cable tensioners can be provided to pull the biomatrix taut, once it is mounted to the fence. In this manner, a vertical garden can quickly and easily be installed in many different urban environments, such as schools and playgrounds.

Many different types of plants can be grown using the biomatrix grow media and the vertical garden structure. Various types of herbs, decorative plants and flowers, and food plants can relatively easily be grown using this system. Generally, plants with standard root systems work best, and many different sizes can be accommodated, while bulb and tuber plants (e.g., potatoes, carrots, turnips, etc.) are not as suitable.

Figure 5:
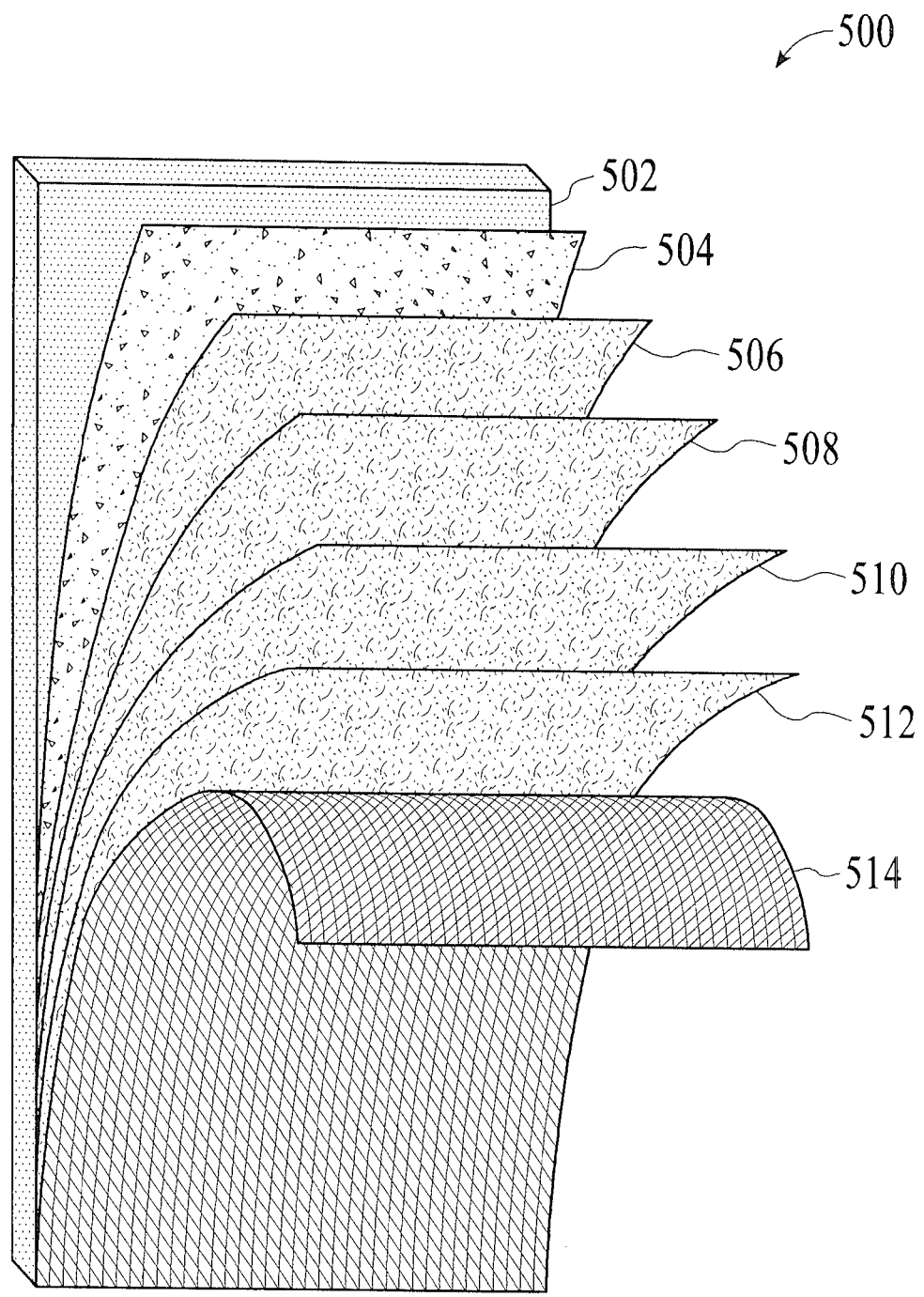
FIG. 5 illustrates the composition of a biomatrix grow media, under an embodiment.

As shown in FIG. 1, a main component of the vertical garden 100 is the flexible biomatrix grow media 104. This is a lightweight, flexible material that is composed several layers joined together to form a composite matrix that supports plants and efficiently distributes water and nutrients. FIG. 5 illustrates the composition of a biomatrix grow media, under an embodiment. The composite biomatrix fabric 500 comprises a main substrate layer 502 which is a backing layer. The backing layer can be made of a waterproof material, such as rubber or rubber-like material, vinyl (e.g., marine-grade vinyl), PVC, or similar material. This layer provides the structural support for the remaining layers of the biomatrix and attaches directly to the frame or wall of the vertical garden. It is an elastic or slightly elastic material that can be stretched by a certain amount to provide tension when deployed in the vertical garden frame or structure. For implementations where the wall garden is attached directly to the surface of a building wall or placed flush against a wall, the backing layer 502 is selected to be impermeable to prevent water from penetrating through and staining or damaging the wall.

In an alternative embodiment, the backing layer can be a permeable layer that is made of a porous material, such as fibrous mesh. This mesh material can be made of natural fibers, such as bamboo or burlap, or it may be made of polypropylene or similar material. The use of a permeable backing layer, as opposed to a non-permeable backing layer allows for the passage of air through the biomatrix, such that the biomatrix forms an air filter structure. This also allows for the growth of plants out of both sides of the material. Such a material can be used for applications requiring air filtration for use in space frame interiors, and should be selected to provide an adequate structural support for the plants as well as permeability for air flow.

An active carbon layer 504 is affixed to the backing layer 502. The active layer is essentially an activated carbon filter layer that helps filter the water supply, adds a carbon nutrient for the plant roots and provides a surface area for microorganism colonies that aids in the bio digestion of the nitrogen load in the water supply and helps with filtering hydrocarbons from the air that are breathed in through the plants leaves and xylem by the photosynthesis and evapo-transpiration cycle. In an embodiment, the active carbon layer is formed by sandwiching an amount of charcoal powder or similar carbon material between two permeable layers.

As shown in FIG. 5, the biomatrix grow media 500 includes a number of capillary biomat layers 506-512 that are attached to the active carbon layer 504. The capillary biomat layers comprise thin mesh fabric layers, such as felt, cotton, vegetable fibers, or similar material, that help distribute water across the entire surface area of the biomatrix 500. Any practical number of capillary layers may be used, and typically range from one to four layers, though embodiments are not so limited. As water is poured, sprayed or otherwise introduced to the biomatrix, the capillary layer or layers help to evenly distribute the water among the plant roots through wicking and capillary action. The outer layer 514 of the biomatrix 500 is a front panel layer that consists of a bio filter fabric and can be made of polypropylene or similar material. This layer provides the main structural support layer for the plants themselves. It is a relatively stiff, porous layer that allows plants to be inserted perpendicularly through the surface of the material, and supports the main stem or body of the plant when the biomatrix is oriented vertically with respect to the ground. The thickness, porosity, and stiffness of the front panel layer 514 can be selected according to the type of plants that are to be grown in the vertical garden. Essentially a relatively thin front panel layer can be used for small plants, such as herbs, and a thicker and/or stiffer front panel layer can be used for larger or heavier plants. In certain lightweight implementations in which very small and light plants are grown, the polypropylene front panel may be omitted to result in a biomatrix that is very light and thin. In this case, the capillary and filter layers provide the physical support structure for the plants.

The front panel layer 514 can be made of either a polypropylene material, which is relatively non-biodegradable, or it can be made of a biodegradable material that can be broken down and/or recycled. Such a biodegradable layer may be made from a fibrous material, such as coconut husk fabric, or similar natural fabric.

The layers of the biomatrix 500 are attached together to form a composite fabric-like material of a thickness on the order of one to two inches thick in total. The layers can be attached to one another through any appropriate means, such as glued, stapled, riveted, or sewn together. For example, in a frame-based vertical garden implementation of approximately 5×8 feet in size, the layers of the biomatrix can be joined by rivets placed every six inches along the edge of the biomatrix. This is just one example of a joining method for the biomatrix, and many other techniques can be used depending on the size, cost, and implementation details of the vertical garden installation.

The biomatrix grow media is a fabric composition that constitutes a combined support, water distribution, and filter system. The biomat and filter layers 502 to 514 are illustrated as a number of separate mat-like components of the same size deployed in a sandwich array. It should be noted, however, that this filter and plant substrate system can be composed of mats and/or filters of any appropriate size, shape and material depending upon configuration and needs. For example, any practical number of capillary biomat layers (e.g., 1-4) may be used, and the active carbon filter layer 502 may be separate or integrated within the one or more capillary mat layers. The capillary biomat layers 506-512 can be built from many different fiber materials and mesh designs. For example, the biomat structures can comprise baskets of stone, glass, charcoal or other locally available substrates.

The biomatrix material 500 features several advantages over present vertical garden media. First, it is thin and lightweight. The thickness of the biomatrix in a typical wall garden implementation is on the order of one-inch thick. The material can be rolled up for ease of transportation and storage. It can be easily deployed in a variety of different frame and wall configurations, as well as portable or movable garden structures. Another advantage is that the biomatrix is pliable and flexible. This allows a degree of stretching, which allows the matrix to be utilized in many different applications, since it can literally be stretched to fit the appropriate area. With a self-contained cable and attachment assembly, the grow media can quickly be mounted virtually anywhere on walls and fences to provide vertical garden installations.

Figure 6:
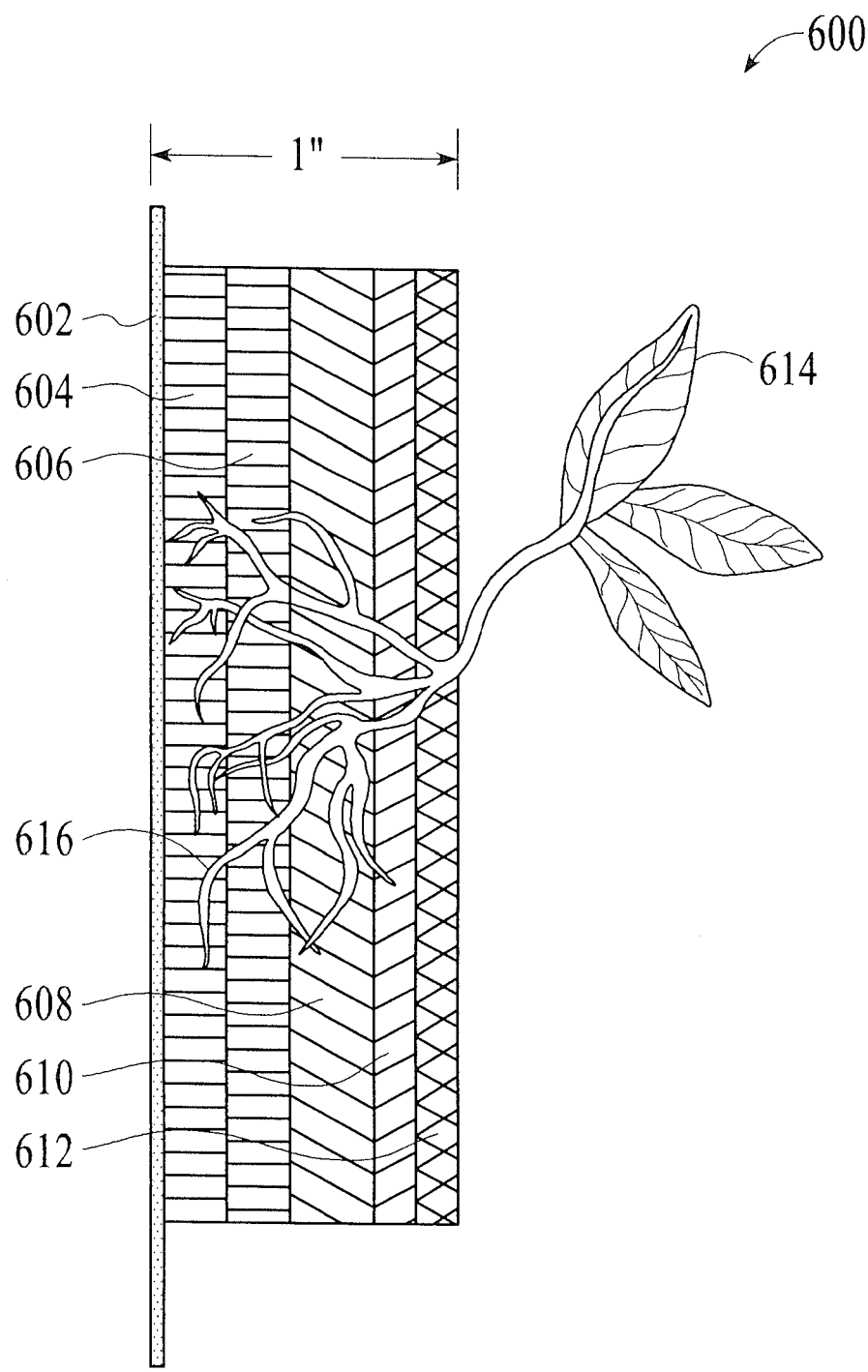
FIG. 6 is a schematic view of a vertical garden and a bio-mat grow media system, under an embodiment.

The biomat and filter structure of the grow media 500 provides a support structure and space for plant roots that grow perpendicularly out of the media. FIG. 6 is a schematic view of a vertical garden and a biomat grow media system, under an embodiment. As shown in FIG. 6, a plant 614 is planted substantially perpendicularly through the front panel 612 and into the capillary 606-610 and the filter layer 604. The plant is held in place by the front panel layer 612, and the roots 616 pass through and grow through the other biomat layers and continue growing into the activated carbon filter layer 604. The biomat assembly is held in place by a biomat holder frame structure or is attached directly to the wall through the waterproof backing material 602.

As shown in FIG. 6, the backing material 602, which is typically a black vinyl layer, constitutes a black background that allows the plants to grow in the proper orientation. In general the plant roots 616 grow into the dark and away from the sunlight that falls on the front layer 612. The impermeable backing layer, which is also a UV block, prevents the roots from penetrating through the back of the biomatrix, and a phenomenon known as "air pruning" prevents the roots from coming back out of the front of the biomatrix. It has been found that the roots grow in small compact circular structures within the filter layer 604 of the biomatrix.

Figure 7:
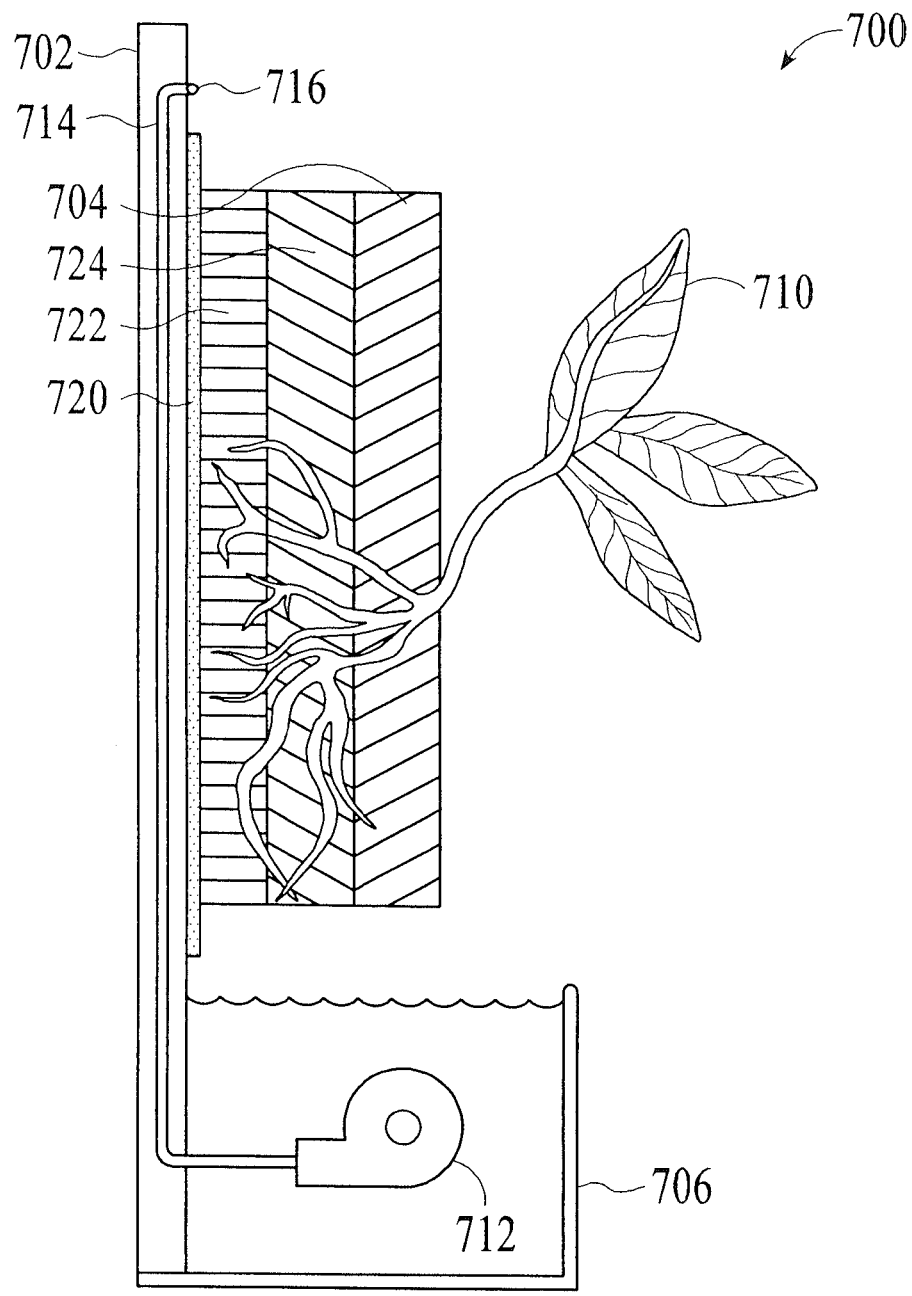
FIG. 7 illustrates the recirculation of water through a pump structure and capillary grow media for a vertical garden, under an embodiment.

In an embodiment, the biomatrix forms an integral part of a vertical garden system that also includes a closed loop water distribution system. This system generally comprises a water reservoir (e.g., a basin, trough or other suitable container), a pump, return pipe, and water distribution pipe, and optionally, an automatic timer. FIG. 7 illustrates the recirculation of water through a pump structure and capillary grow media for a vertical garden, under an embodiment. As shown in FIG. 7, the vertical garden 700 comprises a frame 702 to which is attached the biomatrix grow media 704 that supports plants 710. Water is taken from reservoir 706 by recirculation pump 712 and is fed through tube 714 up to a water return pipe or other water distribution system. For the embodiment of FIG. 7, the water return pipe comprises a section of tubing that runs along a channel 716 that extends across the length of the biomatrix 704. The water is sprayed or dripped out of distribution holes along the length of the tube and permeates a portion of the biomatrix. The biomatrix constitutes a membrane that wicks the water throughout its entire area through the capillary action of the capillary layers. Because of its vertical orientation, excess water is drawn back down through the biomatrix by gravity and back into the water reservoir. In optimal implementations, a timer and appropriate water flow rates are used to minimize excess water use and flowback. Thus, all of the water distributed onto the matrix passes through the activated carbon layer and the vegetable fiber (capillary) biomats and is retained through a water envelope mechanism that uses evapo-transpiration mechanisms. This allows minimal use of water and greatly increases the efficiency of the vertical garden.

Figure 8:
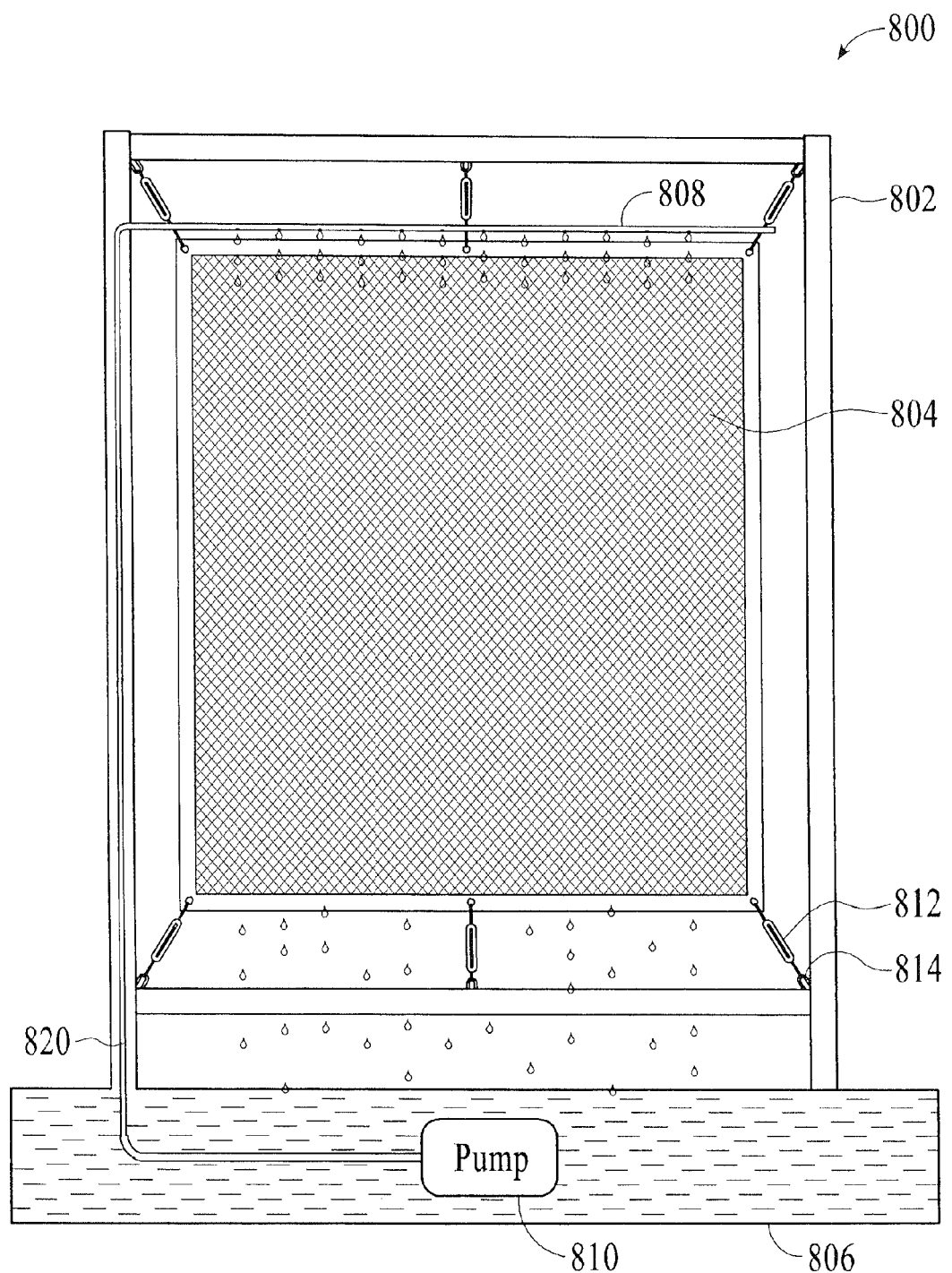
FIG. 8 is a front view of a recirculating water distribution system for a vertical garden under an embodiment.

As shown in FIG. 7, the water redistribution mechanism comprises a pump, return pipe and water distribution tube that is contained in a channel and allows water to basically be drawn through the biomatrix material through capillary action. In this embodiment, water essentially leeches onto and through the biomatrix material. In an alternative embodiment, a water distribution tube or set of sprinklers may be used to pour water onto the biomatrix. FIG. 8 is a front view of a recirculating water distribution system for a vertical garden under an embodiment. As shown in FIG. 8, the recirculation pump 810 in trough 806 pumps the water back up a plumbing tube 820 to continue the water cycle in a closed loop. Water is fed into an outflow pipe 808, which comprises a pipe with a number of spray holes formed along its length. Water from the outflow pipe 808 drips or flows through these holes onto the biomatrix 804 and is distributed through the biomatrix through the capillary layers. Any excess water then drips back into the water trough 806. The return tube 820 that connects the pump to the outflow pipe 808 may be configured to run within one of the tubes that make up the frame 802 of the vertical garden 800.

Other water return mechanisms may also be used, such as soaker hoses placed adjacent to the biomatrix or water reservoirs that are kept in constant contact with a side or portion of the biomatrix. Other components (not shown) may also be included in the water recirculation system. These include additional plumbing and filtration elements, such as an ultra violet filter/sterilization unit. An upper irrigation reservoir may also be used to hold and drip water onto the biomatrix by gravity feed. In general, the water in system 700 is run on a closed, continuous recirculation loop by means of a pump that is operated by an automated timer that is programmed to run the pump periodically according to a defined timing schedule or continuously at a defined flow rate.

In one embodiment, the capillary biomat layers of the biomatrix may be inoculated with beneficial bacteria (e.g., Nitrosamines and Nitrobacteria) that convert ammonia into nitrite, and then nitrite into nitrate, so that the plants can metabolize. As the water passes through the biomats, effluent and nutrients are metabolized by the plant roots and the beneficial bacteria. In this case, any excess water may be returned to the reservoir clear of materials. This application is typically used when the biomatrix is used in a system that includes a fish pond, as described below.

In another embodiment, the water reservoir 806 may comprise a fish pond that contains a number of fish. In this embodiment, the water in the fish pond collects waste from the fish, dead plants, uneaten fish food, and other biological residue. These are passed as part of the nutrient load in the water incorporating ammonia, nitrites, nitrates, and nitrogen. The water and both soluble and solid wastes are sucked up from the floor of the fish pond and recycled through a biological filter system that consists of the filter and capillary biomats on which plants are grown. The bio mats may be inoculated with the beneficial bacteria and nutrients (e.g., nitrobacteria and nitrosamines) for the purpose of breaking down the ammonia and nitrite load in the water and converting components in the effluent into nitrate, a plant food.

The biomatrix may even be provided in the form of fabric sheets that can be used to make tents, awnings, or similar protective or structural fabric structures. In this case, the structural fabric can be used to grow plants as well as provide shelter.

The vertical aquaponic garden according to embodiments allows a form of farming or gardening that is suitable for virtually any size flat or vertical surface. In general, the vertical garden structure comprises a square or rectangular scaffolding or frame support structure. Alternatively, no standalone frame structure may be used and the system may instead be flat mounted on a vertical (wall) or horizontal (ground) surface. For flat farming options, the frame can be placed horizontally rather than vertically and run on a hydroponic growing system. Alternatively, the biomatrix grow media may be installed directly on or above the ground and attached through pegs or other connection means.

Other alternative embodiments of the vertical aquaponic micro farm are possible. For example, it is possible to run the vertical garden system without the aquaculture component FIGS. 7 and 8. In the absence of the aquaculture component, water, as well as nutrients and microorganisms can be applied to the biomatrix by hosing the biomatrix, spraying the plants, or periodic soaking of the biomatrix.

The system can be installed indoors with the addition of an appropriate light system or out doors with natural sun light. The biomatrix can be seeded directly as is conventionally done with soil-based plants. The biomatrix system can also be pre-seeded, sprouted and placed into a vertical garden, as seasonal conditions permit.

Embodiments of the grow media can be used in any type of closed-loop aquatic and closed-loop electrical system for growing plants comprising: a support structure, the biomatrix placed in the support structure in a substantially vertical orientation and supporting the growth of one or more varieties of plants, a water source coupled to the bio-mats through a pump and plumbing system, wherein the plumbing system is configured to draw water from the water source through the bio-mats and back to the water source in substantially closed loop aquatic system, and one or more power generation components generating power from non-electrical grid-based power sources, and a power storage system storing power generated by the power generation components and providing electrical energy to the pump and plumbing system to provide power in a substantially closed-loop electrical system. In this system, the plumbing system comprises one or more water pumps and filters, and the power generation circuits may include wind turbines, water turbines, solar panels, and human-powered generators.

Air Filtration System

In an embodiment, the biomatrix grow media can be installed or mounted in a hydroponic wall filter system that includes an air flow and filtration subsystem to move air through the structure of leaves and roots of plants growing from the biomatrix. Such a system draws air inward through the biomatrix and plant structure and discharges clean filtered air out of a port or vent in the unit to clean and refresh the air within a room.

Figure 9:
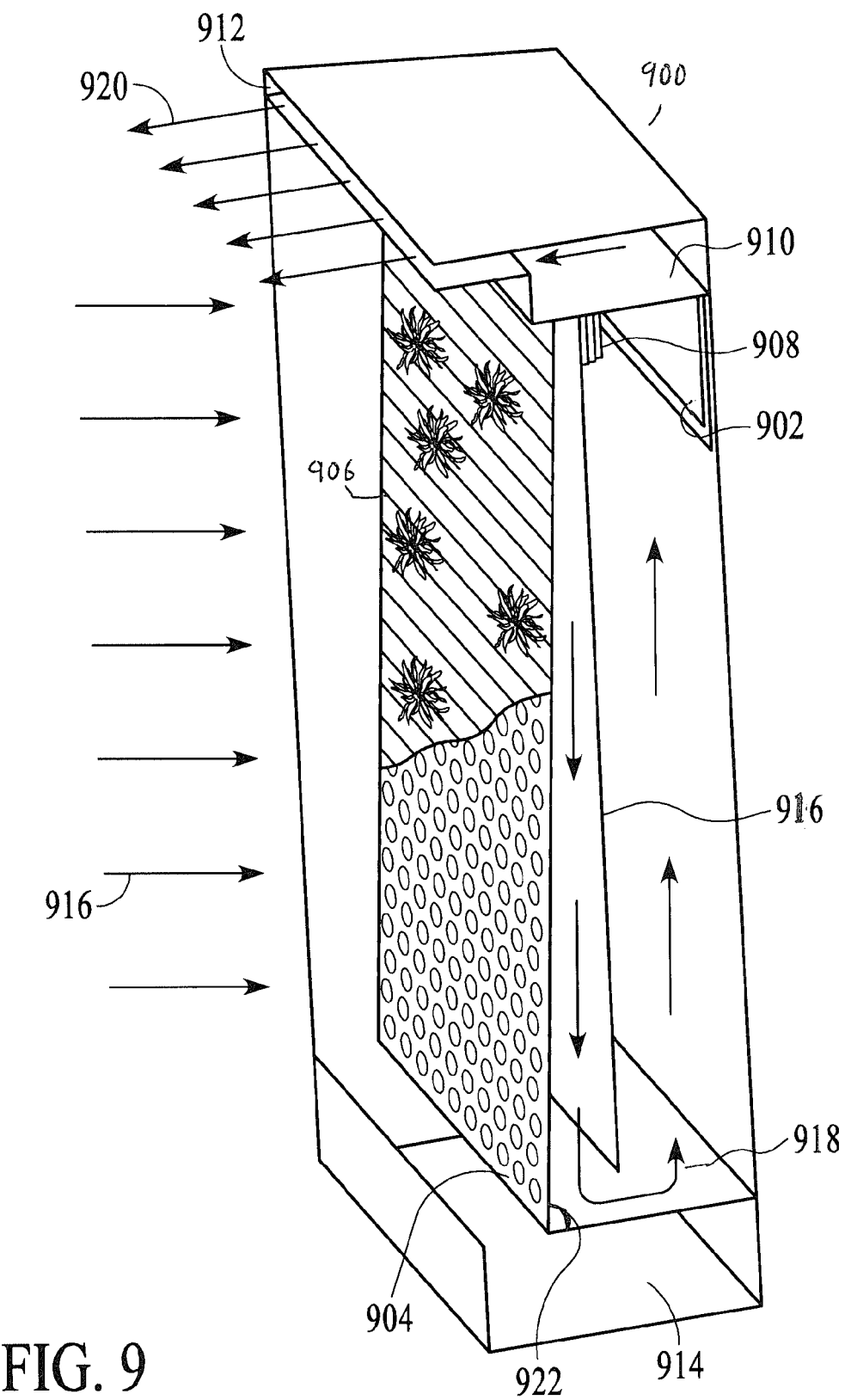
FIG. 9 illustrates a wall garden-based hydroponic filter system, under an embodiment.

FIG. 9 illustrates a wall garden-based hydroponic filter system 900, under an embodiment. Filtration unit 900 comprising a biomatrix grow media 906 mounted onto a perforated backing element 904. FIG. 9 illustrates a partial coverage of the biomatrix over the backing element, but in most implementations, the biomatrix would cover the entire surface of the backing element. The backing element 904 is configured to provide support for the biomatrix 906 that has plants inserted and growing outward from the media, and to facilitate the flow of air 916 through the grow media and certain airflow channels within the filtration unit 900. As shown FIG. 9, external air 916 is drawn through the plant structure and biomatrix 906 where it is effectively purified or filtered through the natural filtration process provided by plants and greenery. Different types of plants may be used for this purpose, and the amount of air purification that is provided can be altered using a different variety and density of plant structures.

Filtration unit 900 includes a baffle structure 916 that channels the filtered air 918 within the unit. The baffle structure defines an internal airflow channel or channels, and can be made up of different internal wall elements depending on the configuration of the unit. In an embodiment, the baffle 906 is a solid sheet of stainless steel, sealed at a portion of the top and sides to provide an inlet channel. Air 916 is drawn from the outside by an internal mounted fan 908 through the biomatrix 906 and the perforated backing 904. down the front face of the baffle 916. The air moves under the bottom edge of the baffle, then up the rear face of the baffle to an outlet channel defined by panels such as panel 902 and 910. The filtered air 918 is then returned to the room as expelled air 920 through an opening or vent 912 in the top/front of the system. The baffle 916 allows the air to be drawn at an equal flow rate across both the vertical and horizontal dimensions of the biomatrix grow medium.

In an embodiment, the airflow channels are generally formed by one or more interior walls or surfaces of the unit, such as a baffle 906 so that clean filtered air 920 is ejected out of a vent 912. A fan 908 mounted within the unit draws the external air 916 through the biomatrix 906 and backing element 904 and creates the clean filtered air that is channeled as internal air flow 918 for ejection out of the unit. As shown in FIG. 9, the fan 908 and clean air output vent is located in an upper portion of the unit 900, but other mounting configurations are also possible, such as side mounting, or bottom mounting for ejection of the filtered air out of other vent locations, such as the back, middle, or sides of the unit.

Figure 14:
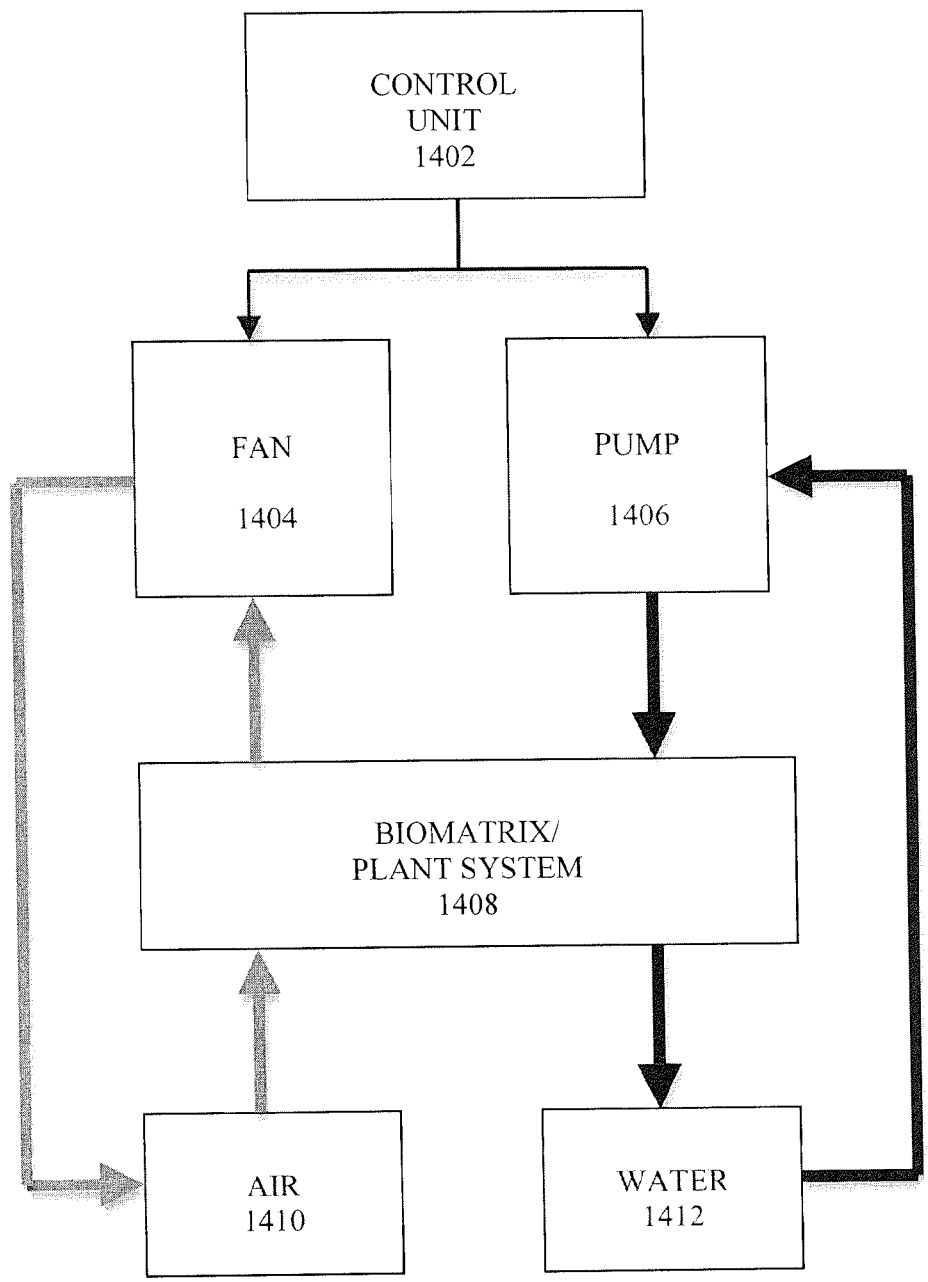
FIG. 14 is a block diagram that illustrates certain functional components of an air and water hydroponic filtration system, under an embodiment.

As also shown in FIG. 9, the filtration unit includes a bottom portion that forms at least part of a water reservoir 914 for use of the biomatrix in a hydroponic application utilizing a water pump and flow process, as illustrated in FIG. 3, for example. In this manner, the filtration unit filters both air and water through the biomatrix/plant system. FIG. 14 is a block diagram that illustrates certain functional components of an air and water hydroponic filtration system, under an embodiment. A biomatrix/plant system 1408 comprising a biomatrix or grow media supporting a set of growing plants is mounted in an appropriate structure, such as the filtration unit 900 of FIG. 9. A fan 1404 draws air 1410 from a room or area (or other appropriate supply) through the biomatrix/plant system 1408 for filtration where it is then returned to the supply or environment. Similarly, a pump 1406 pumps water 1412 from a water supply (e.g., integrated water reservoir) through the biomatrix/plant system 1408 for filtration where it is then returned to the water supply. A control unit 1402 can control certain parameters associated with fan 1404 and pump 1406, such as flow or pump rates, cycle times, and so on. The control unit 1402 can be a single integrated unit for both functions (air and water filtration) or it can be a separated or distributed control unit for the different functions. As shown in FIG. 14, the filtration unit essentially creates two filter loops within one unit using a single biomatrix structure. One loop filters air and the other filters water using the natural filtration capabilities of growing plants. In an embodiment, the biomatrix is a composite grow media, such as illustrated in FIG. 5, and the water filtration system is a closed loop system, such as shown in FIG. 7.

Figure 10:
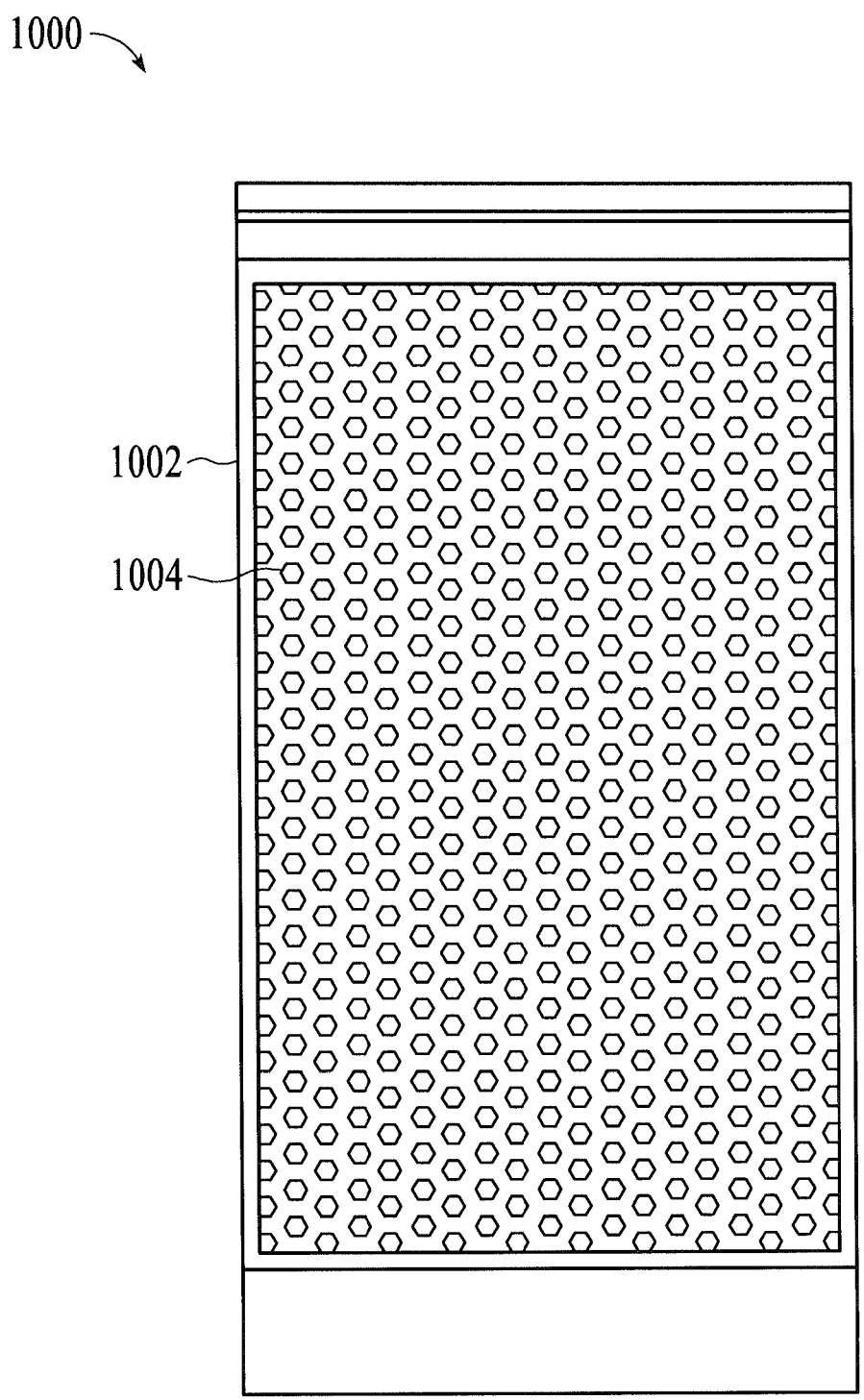
FIG. 10 illustrates a perforated backing that can be used to mount the biomatrix for use in a filtration system, under an embodiment.

As shown in FIG. 9, the biomatrix is mounted to a backing structure to provide a rigid mounting surface within the filtration unit, as well as to provide a surface that facilitates the flow of air through the unit. FIG. 10 illustrates a perforated backing that can be used to mount the biomatrix for use in a filtration system, under an embodiment. As shown in FIG. 10, the backing element 1002 is a perforated steel sheet (of ⅛" thickness, for example) with a number of holes 1004 disposed throughout the surface of the sheet. In an embodiment, the holes are approximately ⅜" in diameter and spaced approximately ¼" center-to-center, though other hole sizes and spacings are also possible depending on configuration and implementation requirements. The sheet 1002 can also include certain non-perforated sections that form a frame or other structure to provide strength and mounting or attachment elements. In an embodiment, the perforated steel sheet to which the biomatrix is attached is mounted at an angle 922 off vertical, as shown in FIG. 9. This angular alignment minimizes water migrating off of plant stems and dipping onto floors or surfaces outside of the system, as water flows through the biomatrix 906 down to reservoir 914. The angle of the biomatrix and perforated backing can range from any practical angle 922, such as from 3° to 7° and in most applications, an angle of about 5° may be a preferred angle.

Figure 11:
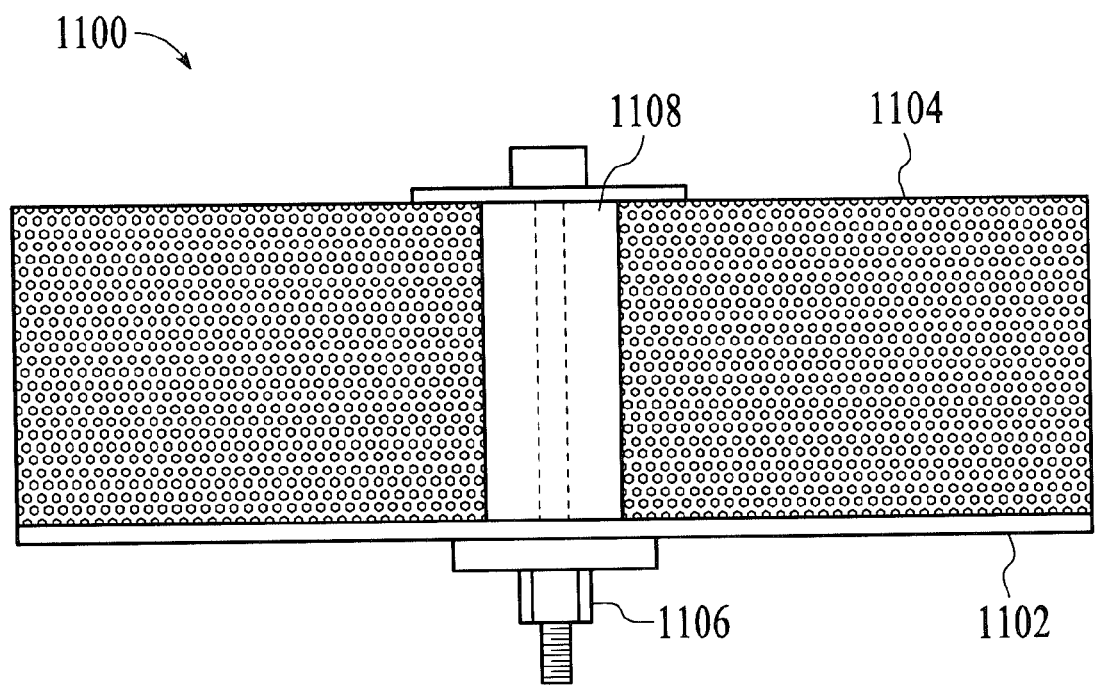
FIG. 11 illustrates the mounting of a biomatrix on a perforated backing element, under an embodiment.

FIG. 11 illustrates the mounting of a biomatrix on a perforated backing element, under an embodiment. As shown in diagram 1100 the biomatrix 1104 is attached to the perforated backing 1102 by inserting rubber insulated rivet nuts 1106 into some of the perforated openings (e.g., ⅜"). In addition, one-inch tall (or similar height) nylon standoff spacers and washers 1108 can be used to hold the biomatrix 1104 in place without undue compression. Mounting locations can vary depending on the size of the biomatrix and the density/weight of the plant structure, among other implementation details. In an example implementation, the rivet nut/spacers can be placed 12" apart horizontally and 9" apart vertically, though other spacings and configurations are also possible.

Figure 12:
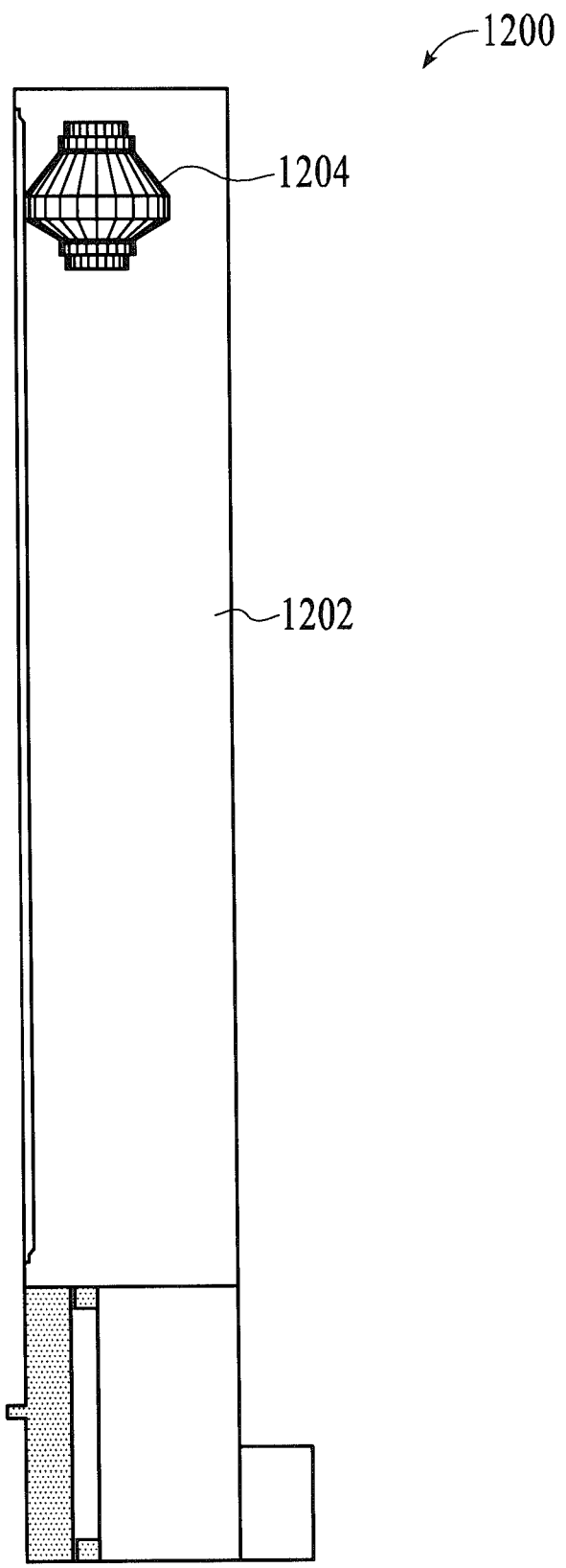
FIG. 12 illustrates the mounting of a fan within the filtration unit, under an embodiment.

As shown in FIGS. 9 and 14, an internal fan is used to draw air from the outside of the unit through the biomatrix and back out to the outside. FIG. 12 illustrates the mounting of a fan within the filtration unit, under an embodiment. FIG. 12 generally illustrates a side view of the unit 900. For the embodiment diagram 1200, the exhaust fan 1202 is shown as being mounted on an upper portion of the unit 1202. The fan may be an inline exhaust fan, or any similar type of fan. In general, any appropriate exhaust fan designed to move air within residential or commercial applications, such as crawl pace venting or air supply applications can be used. Different fan size and operating specifications (e.g., airflow capacity, power requirements, etc.) may be used based on the configuration of the unit and the implementation requirements of the filtration unit. As stated above, the illustrated embodiments show the exhaust fan 1204 as mounted in an upper portion of the filtration unit, which corresponds to the location of the clean air ejection vent. Other locations for mounting the fan, and venting the clean air are also possible, however.

The fan can be configured to run constantly or it can be controlled to operate periodically or only at specified times. In an embodiment, the filtration unit includes a control subsystem that controls certain operating parameters of the fan, such as timing, airflow, and other possible adjustable characteristics. For example, a timer (e.g., a lighting timer) with a calendar function can be used to cycle the fan a set number (e.g. twice) of times per day for a period of time sufficient to move the total volume of air in the interior of the space through the system during a defined filtration cycle. Cycle times will vary with the volume of air in a given space, and other implementation requirements. Other ancillary electric elements associated with the filtration unit, such as lights, water pump, and so on, can also be controlled through the control subsystem, such as shown in FIG. 14.

As shown in FIG. 9, the filtration unit includes a water reservoir 914 to hold water flowing through the biomatrix 906. One or more water pumps, such as a 750-gallon per hour submersible pump in the reservoir can be used to pump water to the top of the system. The size of the pump will vary with the volume of water in the reservoir and the height of the emitter array above water level. The control subsystem can include a timer (e.g., a percentage timer) to control irrigation/pump cycles. Pump cycles can depend on implementation details, and in a typical configuration, timers that provide relatively short on-times and long off-times, with frequent cycles throughout the day are appropriate for many plant structures.

Figure 13:
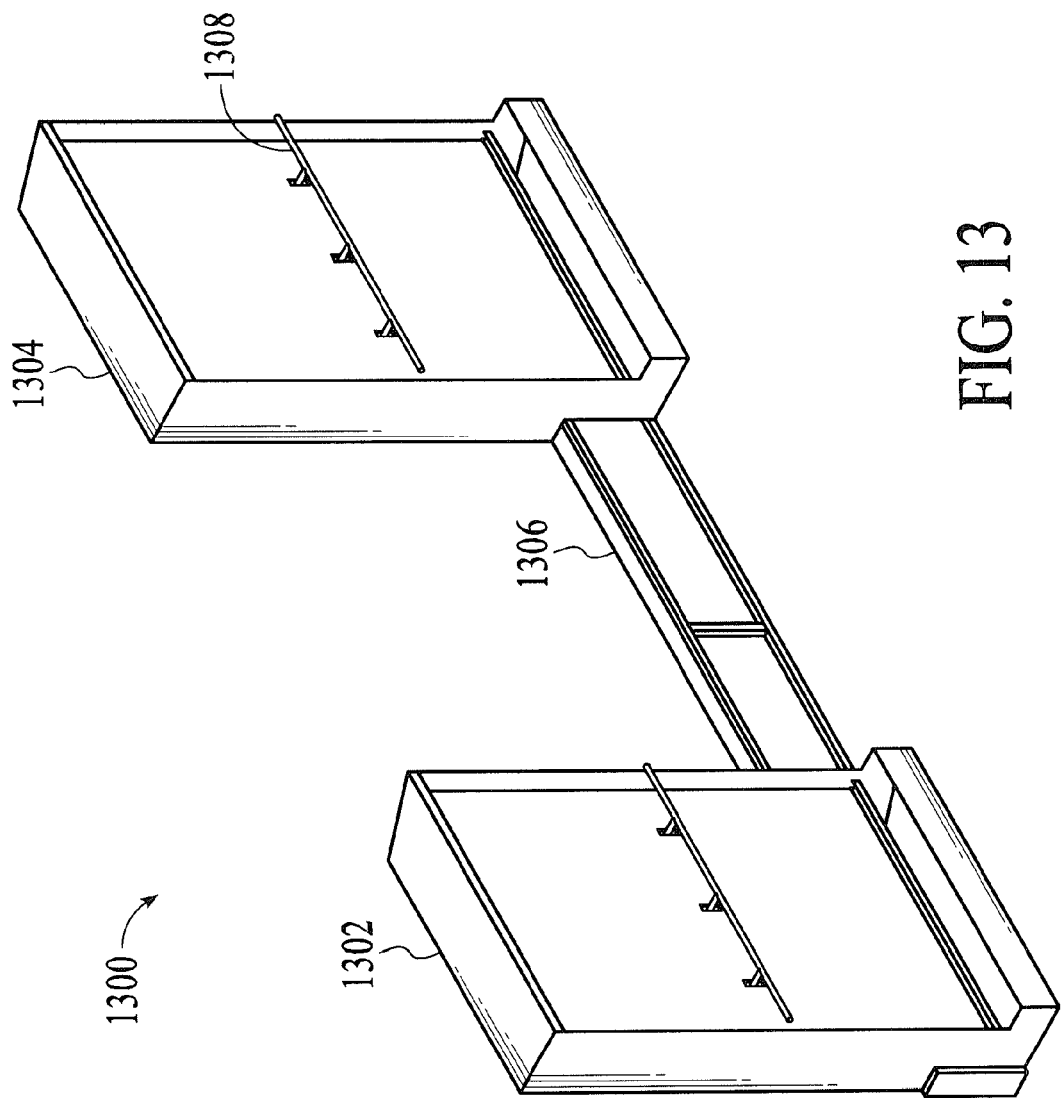
FIG. 13 illustrates the use of two filtration units to form a wall filter system, under an embodiment.

In an embodiment, the filtration unit may form part of a wall garden that includes an assembly of filtration units for placement against a wall or surface in a building. FIG. 13 illustrates the use of two filtration units to form a wall filter system, under an embodiment. As shown in diagram 1300, two filtration units 1302 and 1304 are joined together by a brace structure 1306. The filtration units can be the same size and shape, as shown, or they can be of different sizes and shapes, and can be used to grow the same or different types of plants. Such a structure as shown in FIG. 13 can be used to form a wall garden around windows or openings within a room or to facilitate framing certain architectural elements with plants within a room. Depending on the size of the filtration systems, one or more braces 1306 can be provided to facilitate the mounting of the biomatrix on the filtration unit and/or the filtration units against the wall.

Although embodiments of a filtration system are described and illustrated for a substantially vertical orientation, it should be noted that other configurations are possible, including horizontal mounting of the biomatrix or any appropriate angle between 0 and 90 degrees.

Embodiments are described for a closed-loop, vertical garden system for growing plants and filtering air comprising: a support structure; a composite, lightweight grow media for use in vertical aquaponic gardens and configured to physically support the growth of plants and distribute water to the roots of the plants through capillary action through the area of the grow media; a water source coupled to the grow media through a pump and plumbing system, wherein the plumbing system is configured to draw water from the water source through the grow media and back to the water source in substantially closed loop aquatic system; and an air flow subsystem configured to draw outside air through the plants and transmit filtered air back out through the support structure.

Embodiments are further described for an apparatus comprising: a support structure configured to be oriented vertically with respect to the ground; a perforated backing element mounted within the support structure; a grow media mounted to the perforated backing unit for supporting the growth of one or more varieties of plants in a direction substantially perpendicular to the plane of the backing element and distribute water to the roots of the plants through capillary action through the area of the grow media; and a fan disposed within the support structure and configured to draw air from outside of the support structure through the plants and out of a vent of the support structure.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the vertical aquaponic micro garden and filtration system is not intended to be exhaustive or to limit the embodiments to the precise form or structures disclosed. While specific embodiments of, and examples for, the micro farm are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the location-based social network manager process in light of the above detailed description.

In general, in any following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the vertical aquaponic micro farm and filtration system, according to an embodiment are presented below in certain claim forms, the inventor contemplates the various aspects of the methodology in any number of claim forms. Accordingly, the inventor reserves the right to add additional claims after filing the application to pursue such additional claim forms for other aspects of the described systems and methods.

What is claimed is:

1. An apparatus comprising:
    a support structure configured to be oriented substantially vertically with respect to the ground;
    a perforated backing element mounted within the support structure, the perforated backing element configured to support a grow medium facilitating growth of one or more varieties of plants in a direction substantially perpendicular to the plane of the backing element;
    a baffle within the support structure and configured to create a channel within the apparatus to allow air to flow down a front face, under a bottom edge and up a rear face of the baffle through the channel, and further configured to allow air to flow at an approximately equal rate across both vertical and horizontal dimensions of the grow medium;
    a fan mounted along a top portion of the support structure and configured to draw air from outside of the support structure through the grow media and channel; and
    a longitudinal vent disposed along a top portion of the channel formed by the baffle to discharge the air flowed by the fan out of the support structure.

2. The apparatus of claim 1 wherein the support structure comprises at least a partially enclosed area configured to channel the air drawn from the outside and through the vent.

3. The apparatus of claim 2 wherein the vent comprises a slot opening that discharges air from the inside of the support structure back to the outside of the support structure.

4. The apparatus of claim 1 wherein the perforated backing element is disposed within the support structure at an angle relative to a perpendicular axis of the support structure.

5. The apparatus of claim 4 wherein the angle is within the range of 3 degrees to 7 degrees.

6. The apparatus of claim 1 wherein the fan comprises an inline exhaust fan.

7. The apparatus of claim 6 further comprising a control circuit including a timer controlling a periodic operation of the fan.

* * * * *